United States Patent
Sodot et al.

(10) Patent No.: US 9,294,190 B2
(45) Date of Patent: Mar. 22, 2016

(54) LOW COST DIRECT MODULATION AND COHERENT DETECTION OPTICAL OFDM

(75) Inventors: Dan Sodot, Kfar Bilu (IL); Nir Sheffi, Rehovot (IL)

(73) Assignee: BEN-GURION UNIVERSITY OF THE NEGEV, RESEARCH AND DEVELOPMENT AUTHORITY, Beer Sheva (IL)

( * ) Notice: Subject to any disclaimer, the term of this patent is extended or adjusted under 35 U.S.C. 154(b) by 102 days.

(21) Appl. No.: 13/884,100

(22) PCT Filed: Nov. 7, 2011

(86) PCT No.: PCT/IL2011/000864
§ 371 (c)(1),
(2), (4) Date: Aug. 12, 2013

(87) PCT Pub. No.: WO2012/090190
PCT Pub. Date: Jul. 5, 2012

(65) Prior Publication Data
US 2013/0315607 A1    Nov. 28, 2013

Related U.S. Application Data

(60) Provisional application No. 61/410,958, filed on Nov. 8, 2010.

(51) Int. Cl.
*H04B 10/61* (2013.01)
*H04B 10/2507* (2013.01)
*H04B 10/63* (2013.01)

(52) U.S. Cl.
CPC .......... *H04B 10/2507* (2013.01); *H04B 10/612* (2013.01); *H04B 10/6161* (2013.01); *H04B 10/6163* (2013.01); *H04B 10/63* (2013.01)

(58) Field of Classification Search
USPC .................................................. 398/202–213
See application file for complete search history.

(56) References Cited

U.S. PATENT DOCUMENTS

| 5,337,170 | A | * | 8/1994 | Khoury et al. | 359/7 |
| 5,436,749 | A | * | 7/1995 | Pidgeon et al. | 398/193 |
| 5,526,159 | A | * | 6/1996 | Gottwald | 398/159 |

(Continued)

OTHER PUBLICATIONS

International Search Report mailed Apr. 17, 2012 of International Application No. PCT/IL11/00864.

*Primary Examiner* — Li Liu
(74) *Attorney, Agent, or Firm* — Hunton & Williams LLP

(57) ABSTRACT

System and method for compensating distortions introduced by an optical channel and by at least one directly modulated transmitting laser that transmits a modulated optical signal that carries data to a receiving end over the optical channel. At the receiving end, the transmitted signal is received by a coherent receiver that processes the received signal by compensating the distortions introduced by the optical channel by applying, on the received signal, an operator being capable of essentially compensating for all fiber distortions in the optical channel; compensating the non-linear phase distortions and/or statistical phase distortions introduced by the directly modulated transmitting laser by applying, on the processed signal obtained after compensating the fiber distortion, a non-linear operator being the extraction of the absolute value of the compensated signal; and extracting the data carried by the processed signal, from the absolute value of the processed signal obtained after compensating the non-linear phase distortions and/or statistical phase distortions, thereby demodulating the processed signal.

12 Claims, 4 Drawing Sheets

(56) References Cited

U.S. PATENT DOCUMENTS

| | | | |
|---|---|---|---|
| 5,594,385 A * | 1/1997 | Anvari | 330/149 |
| 7,826,752 B1 * | 11/2010 | Zanoni et al. | 398/205 |
| 8,112,001 B2 * | 2/2012 | Lowery et al. | 398/158 |
| 2002/0196507 A1 * | 12/2002 | Stuart | 359/179 |
| 2004/0197103 A1 * | 10/2004 | Roberts et al. | 398/159 |
| 2006/0013597 A1 * | 1/2006 | Crivelli et al. | 398/208 |
| 2006/0210282 A1 * | 9/2006 | Iannelli | 398/186 |
| 2007/0140703 A1 * | 6/2007 | Fells | 398/159 |
| 2008/0198051 A1 * | 8/2008 | Tanimura et al. | 341/137 |
| 2010/0014873 A1 | 1/2010 | Bulow | |
| 2010/0046943 A1 | 2/2010 | Noble | |
| 2010/0046961 A1 * | 2/2010 | Tanimura et al. | 398/159 |
| 2010/0054759 A1 * | 3/2010 | Oda et al. | 398/202 |
| 2010/0135656 A1 * | 6/2010 | Khurgin et al. | 398/43 |
| 2010/0232796 A1 | 9/2010 | Cai | |
| 2010/0232809 A1 * | 9/2010 | Cai et al. | 398/202 |
| 2010/0239254 A1 * | 9/2010 | Li et al. | 398/65 |
| 2010/0239261 A1 * | 9/2010 | Li et al. | 398/81 |
| 2010/0239262 A1 * | 9/2010 | Li et al. | 398/81 |
| 2010/0239270 A1 * | 9/2010 | Li et al. | 398/208 |
| 2010/0247099 A1 * | 9/2010 | Lowery et al. | 398/79 |
| 2011/0097075 A1 * | 4/2011 | Tanimura et al. | 398/1 |
| 2011/0234435 A1 * | 9/2011 | Woodward et al. | 341/137 |
| 2012/0033965 A1 * | 2/2012 | Zhang et al. | 398/38 |
| 2012/0063768 A1 * | 3/2012 | Kim et al. | 398/25 |
| 2012/0081780 A1 * | 4/2012 | Qian et al. | 359/341.1 |
| 2012/0087661 A1 * | 4/2012 | Look | 398/65 |
| 2012/0251112 A1 * | 10/2012 | Sadot et al. | 398/65 |

* cited by examiner

LOW COST DIRECT MODULATION AND COHERENT DETECTION OPTICAL OFDM

CROSS-REFERENCE TO RELATED APPLICATIONS

This application is the national phase application of PCT/IL2011/000864, filed Nov. 7, 2011, which claims the benefit of U.S. Provisional Patent Application 61/410,958, filed Nov. 8, 2010, the contents of each are hereby incorporated by reference in their entirety.

FIELD OF THE INVENTION

The present invention relates to the field of optical data communication. More particularly, the invention relates to a digital signal processing (DSP) method that can compensate for both laser frequency response and laser frequency chirp in an Optical Orthogonal Frequency-Division Multiplexing (O-OFDM) system, as well as other modulated optical systems.

BACKGROUND OF THE INVENTION

High speed transmission systems (in which the data rates exceed 10 Gb/s for cost-sensitive applications, such as a metropolitan area network have attracted extensive interest due to the explosive data traffic growth in such applications.

Conventional optical data communication systems include two types of transmission combinations. The first type is a low-cost direct modulation type, according to which data is transmitted by directly modulating the current of a laser transmitter. The second type include a laser biased at constant current and an external modulator that converts the continuous wave light into a data coded pulse train with the right modulation format. Moreover, in recent years it has been suggested to use coherent reception communication systems which could combat using DSP linear channel impairments instead of a single photodiode and allow the use of advanced modulation formats.

The key limiting factor of using direct modulation for high speed communication systems is the transmitting laser frequency chirp (a measure of the change in laser transmitter's optical frequency as the transmitter is modulated). In this case the transmitted optical signal is amplitude modulated. Similarly, the receiver uses a low-cost photodiode for direct detection of the amplitude, so as to extract the transmitted data. In this case, the levels of linear and non-linear phase distortions is unacceptable.

Linear distortions are generally related to the linear distortion introduced by the optical channel, such as Chromatic Dispersion (CD—the dependency of the phase velocity of an optical signal on its wavelength). Other distortions, such as chirp and phase-noise are of a non-linear nature and/or statistical. Therefore, even though systems using direct modulation and direct detection are low-cost system, the linear, non-linear and statistical distortions are convoluted and since direct detection is limited only to amplitude detection, all the data embedded within the phase of the optical signal is lost and the resulting distortion is very large and as a result, the transmitted data cannot be detected.

Regarding the use of external modulator with coherent detection the transmitting laser frequency chirp is very low due to the fact that modulation is done by an external modulator, such as a Mach-Zehnder Modulator. Coherent reception allows efficiently compensating most types of distortions, including phase distortions and therefore, systems of this type are suitable for much longer range optical channels. However, such systems are very expensive.

All the methods described above failed to propose a medium cost system employing a digital signal processing (DSP) process that can compensate for both laser frequency response and laser frequency chirp in an optical communication system, based on laser rate equations and fiber parameters.

It is therefore an object of the present invention to provide a method that allows using a low cost transmitter implemented by standard off-the-shelf lasers (such as Distributed Feedback (DFB) lasers), without requiring any external modulators or optical filters with coherent reception using advanced modulation formats, such as optical OFDM, using direct modulation.

It is an object of the present invention to provide a low cost transmitter which allows using direct modulation for very long ranges of optical channels.

It is still a further object of the present invention to use a low cost transmitter while still allowing minimizing the effect of phase distortions.

Other objects and advantages of the invention will become apparent as the description proceeds.

SUMMARY OF THE INVENTION

The present invention is directed to a method for compensating distortions introduced by an optical channel and by at least one directly modulated transmitting laser that transmits a modulated optical signal that carries data to a receiving end over the optical channel. At the receiving end, the transmitted signal is received by a coherent receiver that processes the received signal by:

a) compensating the distortions introduced by the optical channel by applying, on the received signal, an operator being capable of essentially compensating for all fiber distortions in the optical channel;

b) compensating the non-linear phase distortions and/or statistical phase distortions introduced by the directly modulated transmitting laser by applying, on the processed signal obtained after compensating the fiber distortion, a non-linear operator being the extraction of the absolute value of the compensated signal; and c) extracting the data carried by the processed signal, from the absolute value of the processed signal obtained after compensating the non-linear phase distortions and/or statistical phase distortions, thereby demodulating the processed signal.

Whenever the distortions introduced by the optical channel are linear, the received signal is processed by:

a) compensating the linear distortions introduced by the optical channel by applying, on the received signal, a linear operator being the inverse transfer function of the linear transfer function of the optical channel;

b) compensating the non-linear distortions introduced by the optical channel and by the directly modulated transmitting laser by applying, on the processed signal obtained after compensating the linear distortion, a non-linear operator being the extraction of the absolute value of the linearly compensated signal; and c) extracting the data carried by the processed signal, from the absolute value of the processed signal obtained after compensating the non-linear phase distortions and/or statistical phase distortions, thereby demodulating the processed signal.

The linear distortion may be CD or PMD. Other distortions may be a combination of CD and laser chirp, transmitting laser chirp, frequency offset, laser phase noise of the receiver or transmitter, self phase modulation, cross phase modulation or four wave mixing.

Processing may be made by using DSP hardware. The inverse laser function may be used in the processor of the laser transmitter for compensating for the laser frequency response.

The absolute value may be calculated by multiplying the processed signal by its complex conjugate.

The modulation scheme may be Return-to-Zero (RZ), non-return-to-zero (NRZ), Multi-Level Quadrature Amplitude Modulation (M-QAM), M-Array Phase-Shift Keying (M-PSK), OFDM or any combination of them.

The transmitting laser may be externally modulated.

A plurality of directly modulated lasers of different colors may be transmitting simultaneously over the optical channel. Each laser may transmit using a different optical polarization.

The present invention is also directed to an optical data communication system, that comprises:
a) a directly modulated transmitting laser that transmits a modulated optical signal that carries data to a receiving end over an optical channel; a coherent receiver for receiving the transmitted signal at the receiving end;
b) a processing unit located at the coherent receiver, for processing the received signal and compensating distortions introduced by the optical channel and by the laser by:
b.1) compensating the distortions introduced by the optical channel by applying, on the received signal, an operator being capable of essentially
b.2) compensating for all fiber distortions in the optical channel; compensating the non-linear phase distortions and/or statistical phase distortions introduced by the directly modulated transmitting laser by applying, on the processed signal obtained after compensating the fiber distortion, a non-linear operator being the extraction of the absolute value of the compensated signal; and
b.3) extracting the data carried by the processed signal, from the absolute value of the processed signal obtained after compensating the non-linear phase distortions and/or statistical phase distortions, thereby demodulating the processed signal.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The system proposed by the present invention allows direct modulation with coherent detection O-OFDM system with 51.4 Gb/s. Pre- and post-compensation by means of digital signal processing are performed for laser frequency response, CD and laser frequency chirp.

Optical OFDM Theoretical Model

Figure 1:
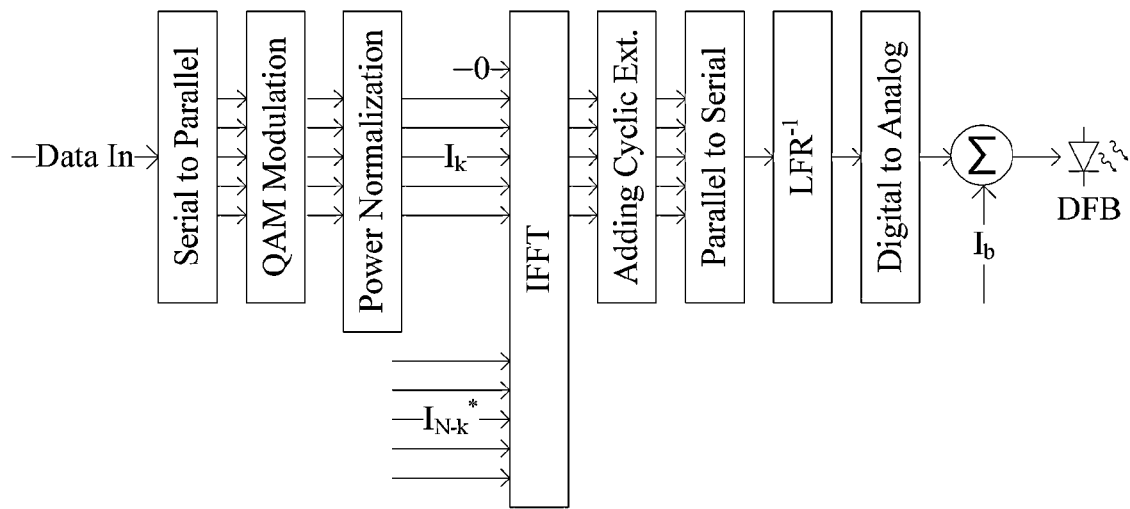
FIG. 1 (prior art) illustrates an optical OFDM transmitter.

FIG. 1 shows an O-OFDM transmitter that includes a serial to parallel converter, which transforms the high line-rate binary data stream into a large number of parallel sets of narrowband data streams, the so called "OFDM tones". Each incoming binary data stream within each set is encoded using Multi-Level Quadrature Amplitude Modulation (M-QAM) modulation and Gray (a modified binary code in which sequential numbers are represented by expressions that differ only in one bit, to minimize errors) encoding. A power normalization of the tones is performed in order to maintain a fixed power of the laser driving current. An Inverse Fast Fourier Transform (IFFT) is then applied to each set of tones to generate a real-valued O-OFDM block. Real-valued symbols are created by maintaining the relation $I_{i,k}=I^*_{i,N-k}$ for k=0, . . . , N−1, where $I^*_{i,N-k}$ is the complex conjugate of $I_{i,N-k}$, N is the IFFT block size and i is the block number. In turn, cyclic extension is added, such that and the resulting signal is serialized. The Laser Frequency Response (LFR) is given by:

$$H_{LFR}(f) = \frac{f_r^2}{f_r^2 - f^2 + jf\left(\frac{\gamma}{2\pi}\right)} \quad [\text{Eq. 1}]$$

Where f is the modulation frequency, γ is the damping factor and $f_r$ is relaxation resonance frequency, which depends on the laser bias current ($I_b$). Therefore, in order to compensate for the laser frequency response distortion, a DSP is used to equalize the signal using $H_{LFR}^{-1}(f)$, which is the inverse function of $H_{LFR}$.

The filtered signal is then converted to an analog form using a Digital-to-Analog Converter (DAC). The analog signal is combined with a laser bias current that directly drives a DFB laser. The laser dynamics is modeled by the laser rate equations, which complies with [Eq. 1]. The laser frequency chirp is given by:

$$\Delta v(t) = \frac{\alpha}{4\pi}\left[\frac{d}{dt}[\ln(OP(t))] + \kappa OP(t)\right] \quad [\text{Eq. 2}]$$

Where OP(t) is the laser output optical power, which is linearly proportional to the laser driving current that carries the information $I_{t,k}$, α is the linewidth enhancement factor (a parameter quantifying the amplitude-phase coupling in a laser) and κ is the adiabatic chirp (the steady state wavelength difference between high and low modulated levels) coefficient. The Single-Mode Fiber (SMF) attribute is given by its fiber transfer function while non-linear effects are neglected:

$$H_F(f) = \exp\left(j\frac{\pi D\lambda^2 L_F}{c}f^2 - \frac{\alpha_F}{2}L_F\right) \quad [\text{Eq. 3}]$$

Where D is the fiber chromatic dispersion, $L_F$ is the fiber length, $\alpha_F$ is the fiber attenuation, λ is the wavelength, and c is the speed of light.

Figure 2:
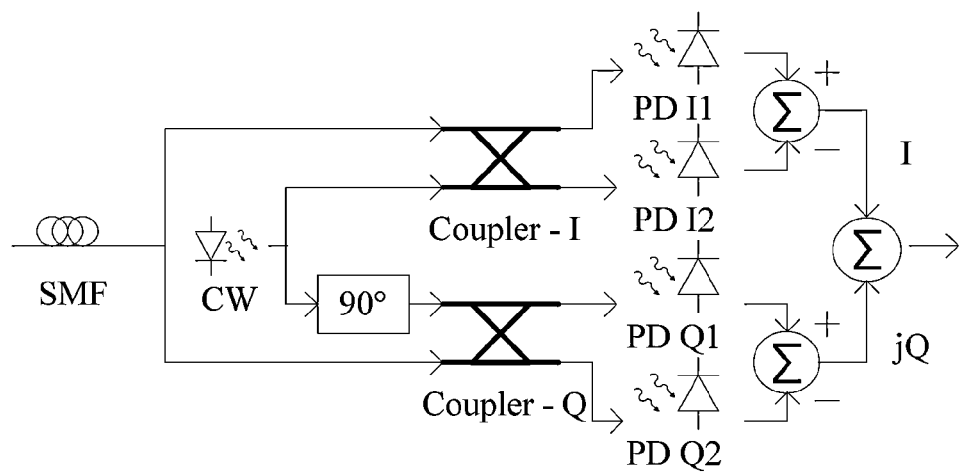
FIG. 2 (prior art) illustrates an optical homodyne coherent receiver

FIG. 2 (prior art) illustrates an optical homodyne coherent receiver. The optical homodyne coherent receiver converts the optical signal to baseband I and Q waveforms by mixing with a 0° and 90° phase of a continuous wave (CW) laser using two balanced detectors. The resulting complex current is expressed by:

$$i_r(t) = 2R\sqrt{OP(t)OP_{CW}} \exp(j\hat{\phi}(t)) \otimes h_F(t) + i_n(t) \qquad [\text{Eq. 4}]$$

Where R is the photodetector responsivity, $OP_{CW}$ is the CW laser optical power, $\hat{\phi}(t)$ is the phase noise caused by the laser frequency chirp, $h_F(t)$ is the SMF impulse response, and $i_n(t)$ is additive white Gaussian noise generated at the photodetectors.

The processing method proposed by the present invention uses a unique combination of a low-cost directly modulated transmitting laser and a coherent receiver, that is capable of compensating both linear distortions (that arise from the attributes of the fiber of in optical channel) and non-linear phase distortions (that arise from the laser chirp and phase-noise). This allows overcoming all types of distortions even if the directly modulated laser transmitter transmits to very long ranges.

Distortion compensation is achieved in two processing steps. At the first step, the received signal passes a linear operator, which compensates for all the linear distortions introduced by the fiber in the optical channel. More generally, the first operator may be capable of essentially compensating for all fiber distortions, such as Self Phase Modulation (SPM) cross-phase modulation (XPM), Four-wave mixing (a non-linear effect arising from a third-order optical nonlinearity), in the optical channel. At the end of this step, only the non-linear phase distortions and statistical distortions (such as chirp and laser phase noise) should be compensated. At the next step, the processed signal that comprises essentially phase distortions (the nature of which is known) passes a non-linear operator that compensate the non-linear phase distortions of the laser.

For example, if the transmitted data carried by the (direct) amplitude modulated signal is given by A, passes through an optical channel with a linear transfer function H (that represents linear distortion of the channel), the received signal is given by $Ae^{j\cdot\Phi(A)} \otimes H$, where $\phi$ represents phase distortions, such as chirp and laser phase noise.

Accordingly, at the first step, the DSP applies a linear operator $H^{-1}$ on the received signal. The resulting processed signal is given by:

$$Ae^{j\cdot\Phi(A)} \otimes H \otimes H^{-1} = Ae^{j\cdot\Phi(A)}$$

At the second step, the DSP applies a non-linear operator, which squares the processed signal or extracts only its absolute value by multiplying the processed signal by its complex conjugate $Ae^{-j\cdot\Phi(A)}$, which is given by:

$$Ae^{j\cdot\Phi(A)} \cdot Ae^{-j\cdot\Phi(A)} = A^2$$

In this example, the amplitude modulated signal A is fully reconstructed. This processing technique is also efficient for more complex signal distortions, such as Polarization Mode Dispersion (PMD—dispersion where two different polarizations of light in a waveguide, propagate at different speeds, causing random spreading of the optical pulses) and for many modulation schemes, such as Return-to-Zero (RZ), non-return-to-zero (NRZ), Multi-Level Quadrature Amplitude Modulation (M-QAM), M-Array Phase-Shift Keying (M-PSK), OFDM or combinations of these schemes.

Figure 3:
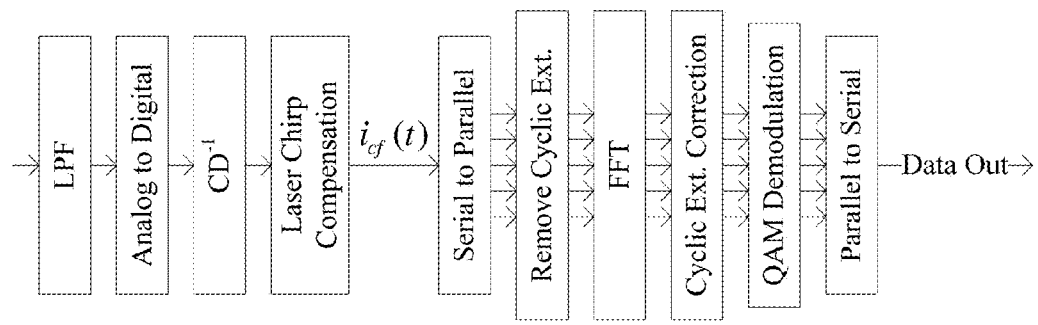
FIG. 3 illustrates an optical OFDM receiver used to efficiently compensate both the channel and direct modulation distortions, according to an embodiment of the invention.

FIG. 3 illustrates an optical OFDM receiver that may be used to efficiently compensate both the channel and direct modulation distortions, according to an embodiment of the invention. According to the proposed compensation method, following a low-pass filter (LPF) and an analog to digital converter (ADC), a DSP CD compensation is applied, based on an inverse function of $$H_{CD}^{-1}(f) = \exp\left(-j\frac{\pi D\lambda^2 L_F}{c} f^2\right) \qquad [\text{Eq. 5}]$$

This CD compensation significantly reduces the required cyclic extension overhead as compared to standard "single tap equalizer", which may also be applied. Since only real valued symbols are being transmitted, the signal is digitally multiplied with its complex conjugate, thus removing the phase $\hat{\phi}(t)$ of the analytical signal. This operation essentially eliminates all the phase-related signal distortions, including laser phase noise, frequency offset, and the laser frequency chirp artifact. The complex conjugate multiplication results in:

$$i_{cf}(t) = (i_r(t) \otimes h_{CD}^{-1}(t)) \cdot (i_r(t) \otimes h_{CD}^{-1}(t))^* = \qquad [\text{Eq. 6}]$$
$$4R^2 OP(t) P_{CW} \exp(-\alpha_F L_F) + 4R\sqrt{OP(t)P_{CW}} \cdot \text{Re}$$
$$\left\{\exp\left(j\hat{\phi}(t) - \frac{\alpha_F}{2}L_F\right) \cdot (i_n(t) \otimes h_{CD}^{-1}(t))^*\right\} + |i_n(t) \otimes h_{CD}^{-1}(t)|^2$$

The first term in the right hand side of [Eq. 6] contains the "chirp free" OFDM signal, while the two other terms are noise×$\sqrt{\text{signal}}$ term dependent upon $\hat{\phi}(t)$ and noise$^2$, which is negligible.

This technique, proposed by the present invention, enables to overcome the loss of orthogonality due to laser frequency chirp and to fully reconstruct and decode the OFDM signal. Following this operation, a serial to parallel converter forwards the chirp-compensated OFDM signal to a cyclic extension removal block. The modulated data is extracted using Fast Fourier Transform (FFT). Cyclic extension window correction for time domain delay takes place, QAM demodulation is performed and finally the data is serialized and recovered.

A numerical simulation of the aforementioned system has been conducted using 102 tones, in which 50 carry real data, one contains the laser bias current ($I_b$) and the remaining 51 are the complex conjugates of the mentioned above tones. The tone spacing is 200 MHz, the cyclic extension (a guard interval produced by replicating part of the OFDM symbol and either prepending or appending the replicated segment onto the original symbol) ratio is 1/6, and therefore the overall transmitted analog bandwidth is 10.17 GHz. 64 QAM is used in each tone. The simulation includes standard DFB laser operating at 1550 nm, standard_SMF and p-i-n photodiode without any optical amplification. Thus, a 51.4 Gb/s transmission is achievable with a 20.34 GHz optical bandwidth. Laser chirp parameters include $\kappa=2\cdot10^{12}$ Hz/W, and $\alpha=2.7$, which are typical values for DFB laser. The ADC block at the receiver samples at 30 GS/s. All simulation results are obtained using a fixed laser frequency response associated with $i_b=40$ mA.

Figure 4:
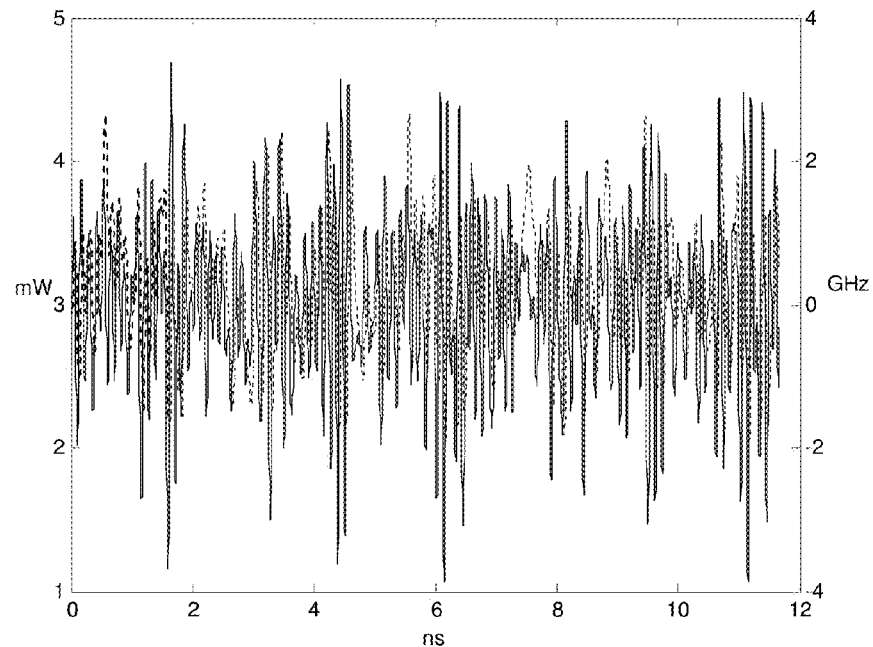
FIG. 4 illustrates power and laser frequency chirp waveforms at the transmitter output.

FIG. 4 illustrates both signal power and laser frequency chirp waveforms at the transmitter output, versus time. The laser frequency chirp is not biased ("ac coupled") due to the ability of the local oscillator laser at the coherent receiver to lock upon a biased change in optical carrier frequency. This ability dramatically drops the laser frequency chirp impact and ADC analog bandwidth requirements.

Figure 5A:
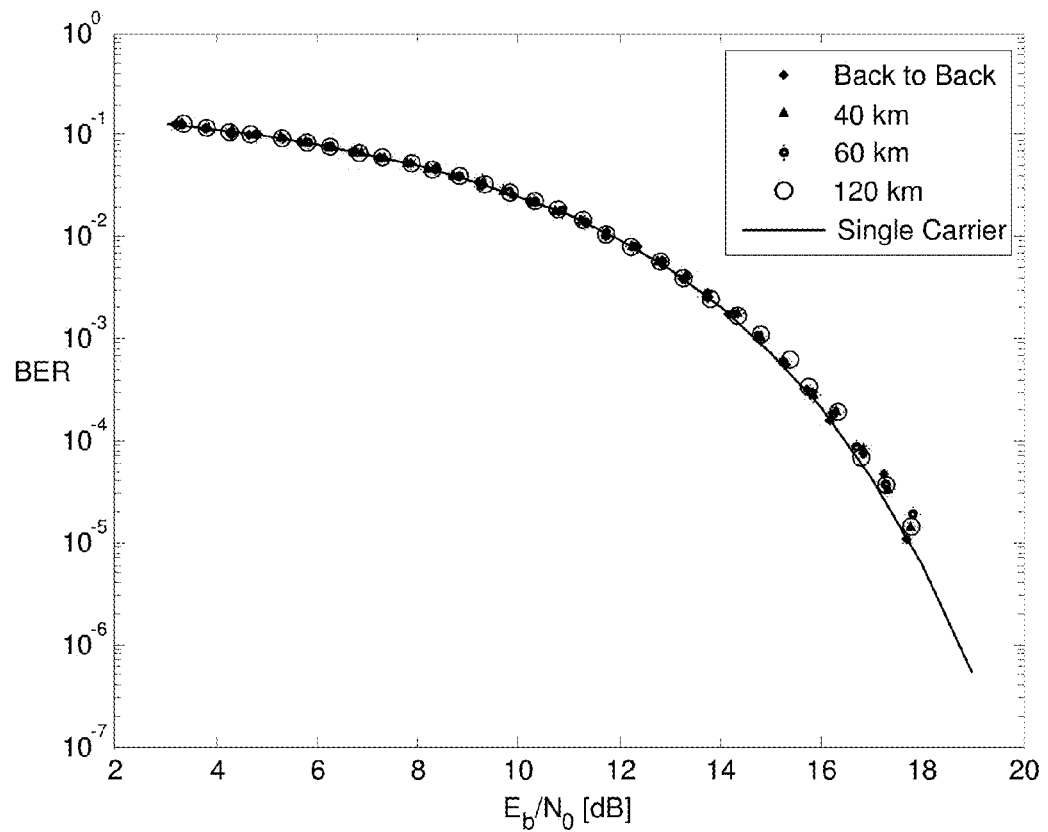
FIG. 5a illustrates a 64 QAM optical OFDM simulation with 51.4 Gb/s and various link lengths (back to back, 40 km, 60 km, 120 km) vs. single carrier transmission—BER vs. $E_b/N_0$.

FIG. 5a illustrates the BER vs. $E_b/N_0$ for various link lengths. The performance of the system proposed by the present invention does not depend on the transmission reach, and therefore, the system fully compensates for both laser frequency chirp and CD. Furthermore, the system proposed by the present invention yields BER results with less than 0.5 dB penalty as compared to a single carrier system. For a pre-FEC BER value of $10^{-3}$ an $\cdot E_b/N_0$ value of 15 dB is required. The recovered signal constellation of 64 QAM symbols in the OFDM receiver after DSP compensation of chromatic dispersion is shown in the inset of FIG. 5a. The laser chirp and laser transfer function distortions are fully compensated.

Figure 5B:
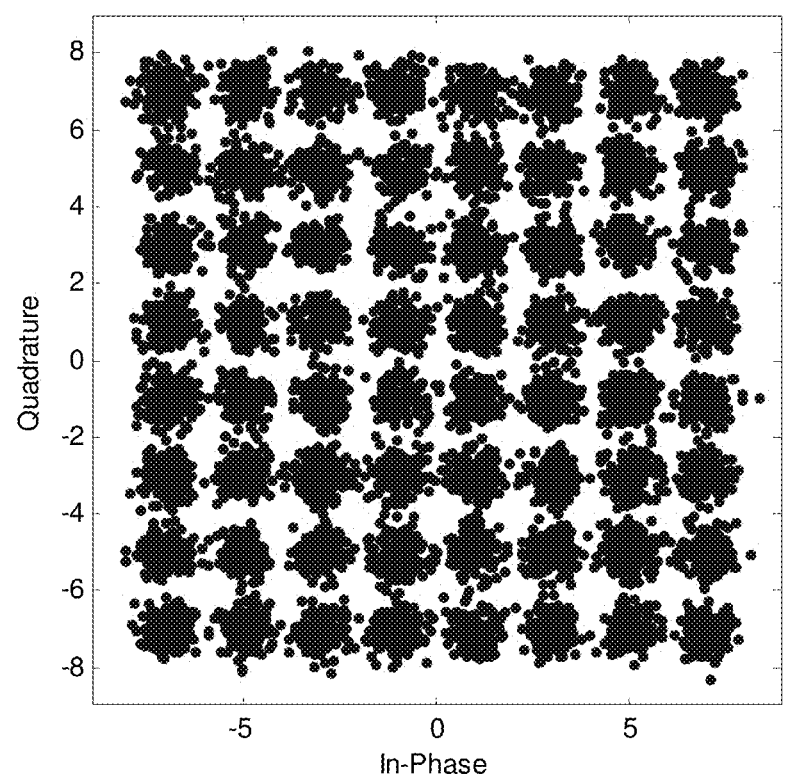
FIG. 5b illustrates a signal constellation with a link length of 60 km showing a BER~$10^{-3}$ for $E_b/N_0$~15 dB.

FIG. 5b illustrates a signal constellation with a link length of 60 km showing a BER~$10^{-3}$ for $E_b/N_0$~15 dB. The symbol constellation is separable and the data can be recovered using complex slicing decision process.

The system proposed by the present invention can be extended to include polarization multiplexing scheme (using two directly modulated transmitting lasers). Such extension essentially doubles the spectral efficiency of the system, while applying polarization de-multiplexing algorithm at the receiver, as being recently and extensively used in dual-polarization coherent detection systems. By applying polarization multiplexing scheme, a 100 Gb/s transmission rate can be supported and the system spectral efficiency is doubled.

In one embodiment, the unique processing method proposed by the present invention, may be also used to fully reconstruct the modulated signal A if a conventional fully coherent system (that uses an external coherent modulator) transmits while all the information is encoded only in the amplitude of the optical signal (rather than both in its amplitude and phase).

According to another embodiment, a plurality of directly modulated lasers of different colors may transmit simultaneously over the optical channel. Each laser can transmit using a different optical polarization. The processing method proposed by the present invention is efficient for compensating distortions for this embodiment, as well. In addition, the inverse laser function may be used in the processor the laser transmitter for compensating for the laser frequency response.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for compensating distortions introduced by an optical channel and by at least one directly modulated transmitting laser that transmits a modulated optical signal that carries data to a receiving end over said optical channel, comprising:
   at said receiving end, receiving the transmitted signal by a coherent receiver;
   at said coherent receiver, processing the received signal by:
   compensating the distortions introduced by said optical channel by applying, on the received signal, an operator being capable of essentially compensating for all fiber distortions in said optical channel;
   compensating the non-linear phase distortions and/or statistical phase distortions introduced by said directly modulated transmitting laser by applying, on the processed signal obtained after compensating said fiber distortion, a non-linear operator being the extraction of the absolute value of the compensated signal; and
   extracting said data carried by the processed signal, from the absolute value of the processed signal obtained after compensating said non-linear phase distortions and/or statistical phase distortions, thereby demodulating the processed signal.

2. The method according to claim 1, wherein when the distortions introduced by the optical channel are linear, the received signal is processed by:
   compensating the linear distortions introduced by said optical channel by applying, on the received signal, a linear operator being the inverse transfer function of the linear transfer function of said optical channel;
   compensating the non-linear distortions introduced by said optical channel and by said directly modulated transmitting laser by applying, on the processed signal obtained after compensating said linear distortion, a non-linear operator being the extraction of the absolute value of the linearly compensated signal; and
   extracting said data carried by the processed signal, from the absolute value of the processed signal obtained after compensating said non-linear phase distortions and/or statistical phase distortions, thereby demodulating the processed signal.

3. The method according to claim 2, wherein the linear distortion is at least one of: CD and PMD.

4. The method according to claim 1, wherein the distortion is a combination of CD and laser chirp.

5. The method according to claim 1, wherein the distortion is at least one of: CD, PMD, transmitting laser chirp, frequency offset, laser phase noise of the receiver or transmitter, self phase modulation, cross phase modulation, and four-wave mixing.

6. The method according to claim 1, wherein processing uses DSP hardware.

7. The method according to claim 1, wherein the absolute value is calculated by multiplying the processed signal by its complex conjugate.

8. The method according to claim 1, wherein the processing uses a modulation scheme comprising at least one of: Return-to-Zero (RZ), non-return-to-zero (NRZ), Multi-Level Quadrature Amplitude Modulation (M-QAM), M-Array Phase-Shift Keying (M-PSK), and OFDM.

9. The method according to claim 1, wherein a plurality of directly modulated lasers of different colors are transmitting simultaneously over the optical channel.

10. The method according to claim 9, wherein each of the plurality of lasers transmits using a different optical polarization.

11. The method according to claim 1, wherein the inverse laser function is used in the processor of the laser transmitter for compensating for the laser frequency response.

12. An optical data communication system, comprising:
   a directly modulated transmitting laser that transmits a modulated optical signal that carries data to a receiving end over an optical channel;
   a coherent receiver for receiving the transmitted signal at said receiving end;
   a processing unit located at said coherent receiver, for processing the received signal and compensating distortions introduced by said optical channel and by said laser by:
   compensating the distortions introduced by said optical channel by applying, on the received signal, an operator being capable of essentially compensating for all fiber distortions in said optical channel;
   compensating the non-linear phase distortions and/or statistical phase distortions introduced by said directly modulated transmitting laser by applying, on the processed signal obtained after compensating said fiber distortion, a non-linear operator being the extraction of the absolute value of the compensated signal; and extracting said data carried by the processed signal, from the absolute value of the processed signal obtained after compensating said non-linear phase distortions and/or statistical phase distortions, thereby demodulating the processed signal.

\* \* \* \* \*